United States Patent
Boegner et al.

[11] Patent Number: 5,965,098
[45] Date of Patent: *Oct. 12, 1999

[54] METHODS AND DEVICES FOR SCRUBBING GASES

[75] Inventors: Walter Boegner, Remseck; Rolf-Dirc Roitzheim, Dornstadt; Martin Hartweg, Erbach; Andrea Seibold, Blaustein; Thomas Fetzer, Speyer; Bernd Morsbach, Ludwigshafen, all of Germany

[73] Assignee: DaimlerChrysler AG, Stuttgart, Germany

[ * ] Notice: This patent is subject to a terminal disclaimer.

[21] Appl. No.: 08/806,511

[22] Filed: Feb. 24, 1997

[30] Foreign Application Priority Data

Feb. 23, 1996 [DE] Germany ............... 196 06 657

[51] Int. Cl.⁶ .................. B01J 8/02; B01J 8/00
[52] U.S. Cl. ..................... 423/213.5; 423/239.1
[58] Field of Search ............... 423/213.5, 239.1, 423/235, 239.2; 502/304, 340; 95/129

[56] References Cited

U.S. PATENT DOCUMENTS

| | | | |
|---|---|---|---|
| 5,270,024 | 12/1993 | Kasahara et al. | 423/213.2 |
| 5,587,135 | 12/1996 | Fetzer et al. | 423/239.1 |
| 5,612,009 | 3/1997 | Fetzer et al. | 423/239.1 |
| 5,736,114 | 4/1998 | Barthe et al. | 423/213.2 |
| 5,750,460 | 5/1998 | Hartweg et al. | 502/342 |
| 5,800,793 | 9/1998 | Cole | 423/213.2 |

FOREIGN PATENT DOCUMENTS

| | | |
|---|---|---|
| 0 210 681 | 2/1987 | European Pat. Off. . |
| 0 540 280 | 5/1993 | European Pat. Off. . |
| 0 676 232 | 10/1995 | European Pat. Off. . |
| 0 685 253 | 12/1995 | European Pat. Off. . |
| 0 687 499 | 12/1995 | European Pat. Off. . |
| 2 728 302 | 6/1996 | France . |
| 44 45 945 | 8/1996 | Germany . |
| 94/02244 | 2/1994 | WIPO . |
| WO 94/04258 | 3/1994 | WIPO . |

*Primary Examiner*—Gary P. Straub
*Attorney, Agent, or Firm*—Evenson, McKeown, Edwards & Lenahan, P.L.L.C.

[57] ABSTRACT

The invention relates to a method and a device for cleaning flowing gases. To reduce the total emissions, nitrogen oxides, especially NO and NOx, are extracted at least partially from the gas to be scrubbed, in the temperature range from 50 and 300° C., preferably between 50 and 150° C. To extract the nitrogen oxides, an intermediate storage medium is used that is composed of a storage material and a supporting material for the storage material. The intermediate storage medium having in particular a composition of the formal chemical formula $Ag.CuAl_2O_4$ in an $Al_2O_3$ matrix, with the composition being a spinel or being of the spinel type, and with the composition having characteristic spinel lines in the x-ray spectrum, where $0 \leq x < 1$.

12 Claims, 2 Drawing Sheets

METHODS AND DEVICES FOR SCRUBBING GASES

This application claims priority of German patent application 196 06 657 filed Feb. 23, 1996, the entire contents of which are expressly incorporated herein by reference.

BACKGROUND OF THE INVENTION

1. Field of the Invention

The invention relates to a method and devices for scrubbing gases.

2. Description of Related Art and Summary of the Invention

For reducing nitrogen oxides from gaseous samples, catalytically active spinels and/or spinel-type compositions have been used with the general chemical formulae:

metal (I) metal (II) $Al_2O_4$ and/or metal (I) oxide.metal (II) oxide.$Al_2O_3$.

However, calculations of the catalytic effect of these compositions assumes they will be used above approximately 150° C. If these compositions are used to scrub exhaust, especially from internal combustion engines, only a slight reduction in nitrogen oxides levels is detected in the starting phase, or immediately after the engine is started, during the period when the temperature of the above-mentioned compositions is below approximately 150° C. Consequently, there is increased emission of nitrogen oxides during the starting phase if these compositions are used in vehicle exhaust systems. In addition, these compositions exhibit reduced effectiveness in removing nitrogen oxides when water and/or steam are present.

In one supported catalyst previously described, an aluminum oxide catalyst containing silver is used to decompose nitrous oxide. The method for its manufacture is discussed in PCT application WO 94/02244. The application of that catalyst to the removal of nitrogen oxides, especially at temperatures below 200° C., is not discussed in WO 94/02244.

A goal of the present invention is to develop methods, devices, and materials for use in reducing the total content of gases, especially nitrogen oxides, optionally in the presence of water and/or steam, from certain emissions, preferably at temperatures below 200° C. This particular goal is achieved through the methods and devices of this invention by employing an intermediate storage medium with gas flow channels in its interior. The intermediate storage medium is composed of a porous storage material for storing nitrogen oxide at a particular temperature range and a supporting material. The intermediate storage medium may be a component of a gas scrubbing device, such as part of a motor vehicle exhaust system.

Advantageously, a supporting material is chosen that simultaneously exhibits a storing effect for hydrocarbons in the nitrogen oxide storing temperature range of the storage material and a catalytically-active effect for nitrogen oxides above a material-specific response temperature. In choosing a supporting material and preparing the compounds and devices of this invention, copending U.S. applications Ser. Nos. 08/764,465 now U.S. Pat. No. 5,905,056, 08/764,464, 08/764,461, and 08/763,535, now abandoned each filed Dec. 12, 1996, can, be referred to and are specifically incorporated herein by reference.

Choosing a supporting material exhibiting a hydrocarbon storing effect is especially advantageous when the method is used or this intermediate storage medium is used with internal combustion engines operated on hydrocarbons, preferably motors or gasoline or diesel engines. Generally, the stored hydrocarbons are released from the supporting material at temperatures above the response temperature at which catalytic reduction of the nitrogen oxides takes place with the aid of hydrocarbons. Preferably, in this regard, the response temperature of the supporting material lies in the vicinity of or below the upper limit of the nitrogen oxide storing temperature range of the storage material, since reduction of nitrogen oxides increases when the storage effect of the storage material decreases.

The supporting material selected for use in an intermediate storage medium may comprise spinels and/or spinel-type compositions according to the formal chemical formula $Cu_xMe_yAl_zO_4$, since compositions of this type exhibit a significant catalytic effect with respect to nitrogen oxides at higher temperatures (above approximately 150° C.). In this case, not only the nitrogen oxides but also the hydrocarbons are extracted from the gas at lower temperatures, so that the total emission output is reduced.

In an exhaust line of an internal combustion engine, the intermediate storage medium is logically used as a filter body that simultaneously causes the storage of NOx and optionally hydrocarbons at temperatures below the response temperature of the supporting material and causes the oxidation of hydrocarbons and the reduction of nitrogen oxides above the response temperature, with the release of the stored hydrocarbons and nitrogen oxides to the gas advantageously taking place in this temperature range. Oxidation and reduction as well as storage of the hydrocarbons are performed by the supporting material that may have additional materials and/or elements besides those mentioned, while the intermediate storage of NOx is performed by the storage material mixed with the support material.

Further logical embodiments can be derived from the descriptions below. In addition, the invention is explained in greater detail with reference to the embodiments shown in the drawings.

Other objects, advantages and novel features of the invention will be apparent to one skilled in the art from the following detailed description of the invention and in conjunction with the accompanying drawings.

1 is the direction of flow through a device; 2 is an intermediate storage medium; 3 is a feed channel; 4 are through flow channels; 5 is an atomizer jet; 6 is a ring jet; 7 7' and 7" are partial bodies of the intermediate storage medium; 8 and 8' are intermediate chambers; and 9 represents an exterior connection of the device to the exhaust line of an internal combustion engine.

Figure 1:
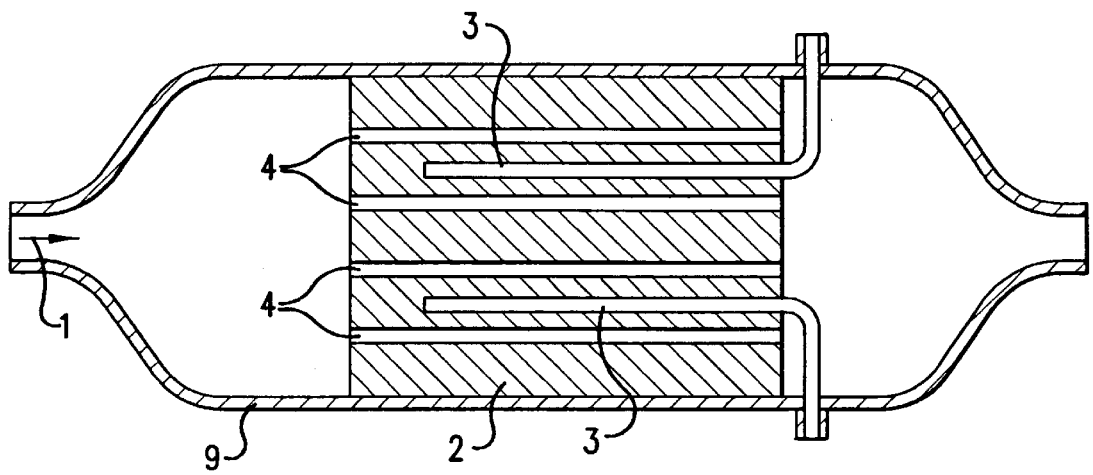
In FIGS. 1, 2, and 3.

FIG. 1 shows a cross section of a device for scrubbing the exhaust of an internal combustion engine, with one intermediate storage medium arrangement.

Figure 2:
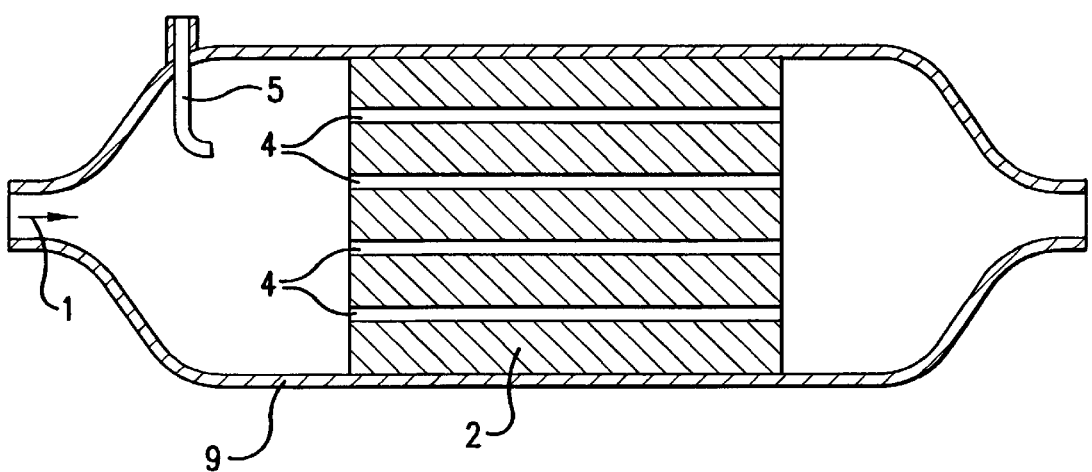

FIG. 2 is the section shown in FIG. 1 with a different intermediate storage medium arrangement.

Figure 3:
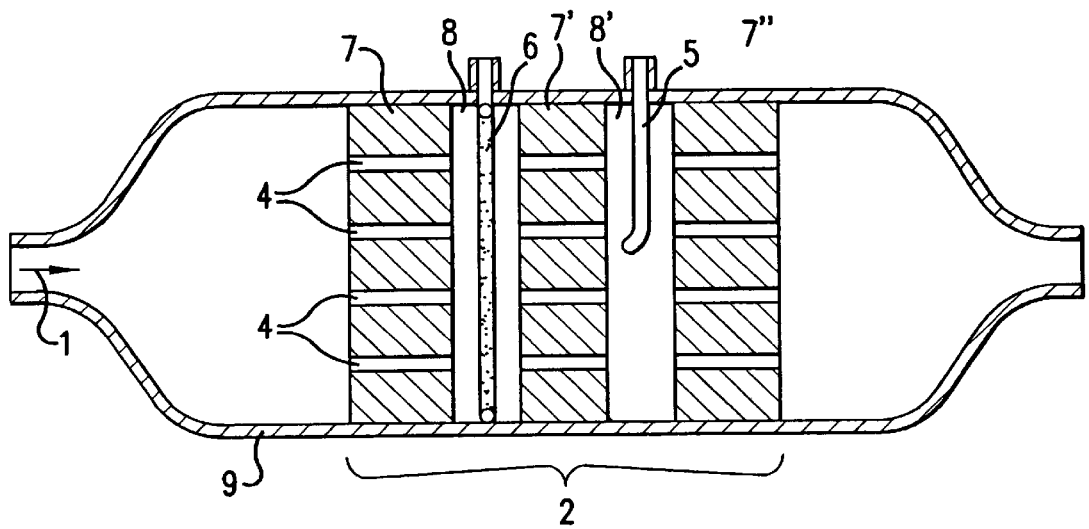

FIG. 3 is the section shown in FIG. 1 with the intermediate storage medium divided into three parts.

Figure 4:
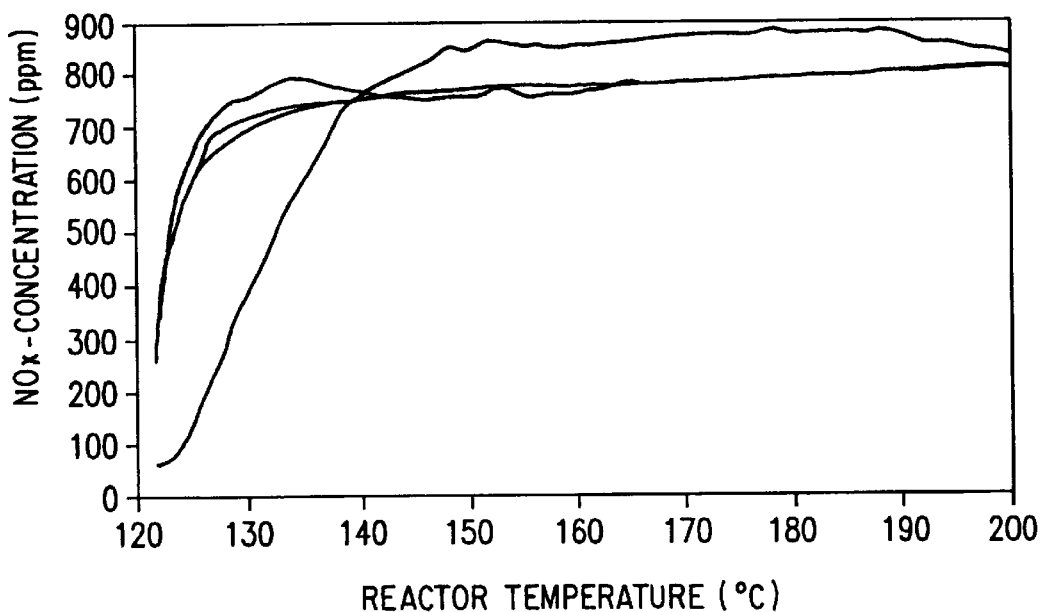

FIG. 4 is a graph showing the NO concentration versus temperature.

DETAILED DESCRIPTION OF CERTAIN EMBODIMENTS OF THE INVENTION

In FIG. 1, a scrubber is shown as a device for processing gases, with intermediate storage medium (2) designed as a filter body being incorporated into an exhaust line 9 of a gasoline-powered, four-cycle engine, especially an automobile engine. Porous intermediate storage medium (2) is made of a storage material and a supporting material. The storage material may be one or more metals of Group I and/or Group VIII of the periodic chart and/or one or more of their metal compounds, especially their oxides, and/or one or more of their metal alloys. Thus, one or more of each of the elements Cu, Ag, Au, Fe, Co, Ni, Ru, Rh, Pd, Re, Os, Ir, Pt, oxides thereof and alloys thereof, can be mixed with the support material in producing an intermediate storage medium.

In one embodiment, the intermediate storage medium is a composition that contains silver, with the general chemical formula $Ag.CuAl_2O_4$ that is made from the carrier material according to a method that is known from WO 94/02244. In this case silver is the storage material, while the $CuAl_2O_4$ is the support material. The intermediate storage medium has the property that nitrogen oxide is bonded or stored by adsorption at temperatures below about 145° C., and released again above about 145° C. The properties of the composition are particularly interesting in that this storage of nitrogen oxide also takes place when detectible amounts of water are present in the gas being scrubbed. This surprising effect can be seen in FIG. 4.

To perform the measurements to produce the graph shown in FIG. 4, a porous composition, extruded in pellets and composed of storage material and supporting material, is exposed to a stream of gas in a heatable reactor, the flow rate of said gas being approximately 30,000 liters per hour. The composition of the gas is as follows: Ar +800 ppm NO +800 ppm $C_3H_6$+10% $O_2$+8% $H_2O$. From the graph, which also shows the behavior of other spinel compositions in the presence of water for comparison, the storage of NO below 145° C. is clearly visible. In addition, the rise in NO concentration beyond the introduced amount of 800 ppm NO above 145° C. shows that the NO that was stored earlier is being released from the storage material. Since water is created during combustion, the storage properties in the presence of water is of great significance.

In the Figures, representing devices incorporating the use of methods of the invention and the compositions and devices of this invention, intermediate storage medium (2) may have as through-flow channels (4) through which the exhaust to be scrubbed flows and which are shown here as straight channels for improved clarity.

The exhaust, flowing through a through-flow channel (4), contains hydrocarbons, which, when above a certain response temperature of the catalytically effective supporting material, serve as reducing agents for the nitrogen oxides that are also present in the exhaust, in this case NO and $NO_2$ in particular. After a certain processing distance, however, the hydrocarbons are used up so that intermediate storage medium (2) is saturated with emissions as far as its catalytic effect is concerned.

In order for further reduction of emissions to be possible within intermediate storage medium 2 in the scrubbing system, the intermediate storage medium 2 composed of a supporting material that acts as a catalyst and composed of a storage material, has an additional channel 3 between two through-flow channels 4 and serving as a feed device for the reducing agent. Feed channel 3 is connected with a storage medium (not shown) of the feed device. Advantageously, feed channel 3 is operably connected, with suitable safety measures being taken, with the tank vent of a motor vehicle so that the gas space in the tank forms the storage medium.

Feed channel 3 in the form of a blind hole, looking in flow direction 1 of the exhaust, is closed on the gas inflow side and connected on the gas outflow side with the storage medium. Ammonia and hydrocarbons, the later for use particularly in motor vehicles, have proven to be satisfactory reducing agents.

When added, the reducing agent flows in on the gas outflow side and diffuses through the intermediate storage medium 2 by capillary-action and flows into through-flow channels 4 where it evaporates, so that the concentration of reducing agent is increased in the already partially scrubbed exhaust.

The increase in the concentration of hydrocarbons that takes place within intermediate storage medium 2 means that the emissions that remain in the pre-scrubbed exhaust are further reduced during the additional passage of the exhaust through intermediate storage medium 2, with the exhaust being cleaned better in the entire scrubbing system. Emissions can also be reduced advantageously with regard to the concentration of carbon monoxide and/or hydrocarbons in the exhaust.

In order for the amount of reducing agent added not to be too large, the feed device optionally has a metering device (not shown) or a volumetric pump so that the amount of reducing agent added can be controlled.

Feed channel 3 can also be provided, starting at the outer circumference of intermediate storage medium 2 and running crosswise to flow direction 1 of the exhaust up to the middle of intermediate storage medium 2. This embodiment, not shown, has the advantage that a plurality of through-flow channels 4 with a single feed channel 3 can be simultaneously charged with reducing agent. It is also favorable in this regard for the feed channel or channels 3 to be supplied in simple fashion with reducing agent from the outer circumference of intermediate storage medium 2.

In the case of intermediate storage medium 2, which is designed to be porous, the feed device can preferably have jets located circumferentially on intermediate storage medium 2, especially a ring jet 6 through which the reducing agent can escape transversely to flow direction 1 of the exhaust through intermediate storage medium 2. The transport of the reducing agent, preferably a gas, in the direction of the exhaust flow likewise takes place through the intermediate storage medium 2.

The reducing agent is advantageously added downstream from a processing section that corresponds to a saturation length of intermediate storage medium 2, with a saturation length corresponding to the distance traversed by the gas after which emissions reduction, especially reduction of nitrogen oxides, becomes saturated, looking in flow direction 1.

FIG. 2 shows another scrubbing system whose intermediate storage medium 2 likewise is located in exhaust line 9 of an internal combustion engine, especially a gasoline-powered four-cycle engine or a four-cycle engine that runs lean. To avoid superfluous repetition, in the following description of embodiments of the invention, represented by FIG. 2, only the differences between the embodiments represented by FIG. 1 will be discussed.

In the embodiments according to FIG. 2, the feed device has an atomizer jet 5 located on the gas inflow side upstream from intermediate storage medium 2 that can be traversed by the exhaust, said jet being provided to atomize the reducing agent. Atomizer jet 5 is dimensioned such that the reducing agent is atomized to form drops of a size such that a drop is completely evaporated in intermediate storage medium 2 only after it has penetrated to a given depth into intermediate storage medium 2, said depth preferably corresponding to at least the saturation length. A drop size of this nature can be determined by one of ordinary skill in the art by empirical methods, for example. Feed of reducing agent with intermediate storage medium 2 takes place by evaporating the drops within intermediate storage medium 2.

FIG. 3 shows other embodiments of a scrubbing system, and in this case also, to avoid superfluous repetition, only the differences between these embodiments and the ones of FIGS. 1 and 2 will be discussed.

In the embodiments according to FIG. 3, intermediate storage medium 2 is divided into three parts like a filter cascade. The partial bodies 7, 7', 7" of intermediate storage medium 2 through which the exhaust can flow and which are made porous are spaced apart from one another and arranged sequentially in flow direction 1 of the exhaust. The length of a partial body 7, 7', 7" measured in flow direction 1 logically corresponds to the saturation length of the supporting material of intermediate storage medium 2.

Jets 5 and 6 that are associated with the feed device are located in intermediate chambers 8, 8' located between partial bodies 7, 7', 7" of intermediate storage medium 2. From the jets, namely an annular jet 6 that is located edgewise and flows outward radially inward into the first intermediate chamber, and atomizer jet 5 centrally located in second intermediate chamber 8', 8, the reducing agent flows into the respective intermediate chambers 8, 8' and mixes with the partially-scrubbed exhaust already there. An intermediate chamber 8, 8' can therefore be thought of as a sort of mixing chamber. The exhaust, enriched with reducing agent in intermediate chambers 8. 8', is then fed to the next partial body 7' or 7" for further reduction of emissions.

In the compositions of the invention and the compositions used in the methods and devices of the invention, the supporting material is a spinel. As used in the invention, a spinel is a material with the general chemical formula $A_aB_bO_4$ which has, at least microscopically, a crystallographic or crystal-like cubic lattice structure with oxygen ions that are face-centered, and tetrahedral and octahedral vacancies, in which tetrahedral vacancies the A particles and up to 50% of the B particles are located and in which octahedral vacancies the remaining B particles are located. Here, an A or B particle merely refers to the crystallographic arrangement.

In accordance with the invention, sub-stoichiometric compounds and/or compositions can also be considered spinels in which the $B_bO_3$ functions as a matrix and which have the characteristic spinel lines in the x-ray spectrum, with the spinel of the formal composition $A_aB_bO_4$ being in a $B_bO_3$ matrix, so that a stoichiometry of $A_a(1-x)B_bO_4$ formally results. In a material regard, the A as well as the B particles can be different from one another.

In the spinel that is used as the supporting material, the A particle is of one or more of the group A elements Mg, Ca, Mn, Fe, Ni, Co, Cu, Zn, Sn, and Ti and the B particle is of one or more group B elements Al, Ga, In, Co, Fe, Cr, Mn, Cu, Zn, Sn, Ti, and Ni. However it should be noted that none of the elements in the exclusion group Mn, Fe, and Co can be an A and a B particle simultaneously.

The following spinel-type compositions have proven to be especially advantageous: $(MgCu)Al_2O_4$; $(CuCu)Al_2O_4$; $(CuZn)Al_2O_4$; $(CoZn)CuAl_2O_4$; mixtures of $(ZnCu)Al_2O_4$ with $WO_3$ and/or $V_2O_5$ and/or $TiO_2$; and $Mg_{0.5}Cu_{0.5}Al_2O_{4-x}$, $Cu_{0.5}Cu_{0.5}Al_2O_4$, $Cu_{0.5}Zn_{0.5}Al_2O_4$, $Co_{0.25}Zn_{0.25}Cu_{0.5}Al_2O_4$, or their mixtures with 10% $WO_3$ and 6% $V_2O_5$ and/or 84% $TiO_2$ and/or $Al_2O_{3x}$. One or more spinels can be used in combination in selecting the composition of a supporting material of the invention.

It has also proven to be advantageous to react the spinels used as supporting materials with catalytically active elements, namely palladium, platinum, rhodium, ruthenium, osmium, iridium, and rhenium and/or rare earths such as lanthanum, and with cerium, vanadium, titanium, niobium, molybdenum, tungsten and/or their salts and/or their oxides. Several of these materials just mentioned or their combinations will be discussed in greater detail as examples.

EXAMPLE 1

A copper/aluminum spinel impregnated with copper, especially the composition $Cu_{0.5}Cu_{0.5}Al_2O_4$, is used as the spinel for the supporting material. The production of spinels involves a method like that known from DE 43 01 4709 specifically incorporated herein by reference. To record an $NOx/CO_2$ graph as a function of temperature, 10 grams of Cu-impregnated $CuAl_2O_4$ spinel were placed in a vertical quartz reactor (20 mm in diameter and approximately 500 mm tall) in which a gas-permeable frit is located in the center to expose the sample. The filing height was about 15 mm. A furnace was placed around the quartz reactor, and heated the middle part of the reactor for a length of about 100 mm so that temperatures of up to 500° C. could be reached.

A gas mixture with a space velocity of about 10,000 per hour was conducted through the supporting material, said mixture consisting of 1000 ppm NO, 1000 ppm propene, 10% oxygen, and the rest argon as the carrier gas. The NO concentration was measured downstream from the reactor with a gas detector, with any $NO_2$ that had formed being reduced in a converter to nitrogen oxide NO before detection. At the same time, oxidation of hydrocarbons to $CO_2$ was observed by measuring $CO_2$ content with the gas detector.

As a result of the measurement of the spinel, a curve is obtained showing the NO and $CO_2$ components as a function of temperature. There was a clear decrease in NOx(NO) concentration with increasing temperature, which reaches a low point between approximately 276 and 294° C. and then rises once more. In the case of the Cu-impregnated $CuAl_2O_4$, there was a drastic decrease in NOx concentration above approximately 200° C. and the hydrocarbons were decomposed simultaneously to form $CO_2$, as indicated by the increase in $CO_2$ concentration. The temperature window in which reduction of NOx takes place is between 200° C. and 400° C., depending on the composition of the material.

Since the measurement methods used are comparable throughout these examples, in the following examples only the differences found will be discussed.

EXAMPLE 2

A magnesium/copper/aluminum spinel, especially the composition $Mg_{0.5}Cu_{0.5}Al_2O_4$ was used as the spinel for the supporting material. The production of the spinel advantageously proceeds by analogy with a method like that known from DE 43 01 4709.

The curve of the NO component shows a clear decrease in NO concentration with rising temperature and reaches a low point at about 320° C.

EXAMPLE 3

A mixture that has a spinel structure and has a composition of 20% ZnO, 16% CuO, and 64% $Al_2O_3$ referred to in the following Examples 3 to 7 as the $ZnCuAl_2O_4$ spinel for reasons of simplicity and impregnated with 1.6 wt. % $CeO_2$ was used as the supporting material.

The measurement of the $ZnCuAl_2O_4$ spinel shows a clear decrease in NOx(NO) concentration with increasing temperature that reaches a low point at about 430° C. and then rises once more. The $ZnCuAl_2O_4$ spinel +1.6 wt. % $CeO_2$ shows a drastic drop in NOx concentration below approximately 150° C., and at the same time the hydrocarbons are decomposed to form $CO_2$ as indicated by the rise in $CO_2$ concentration. The temperature window in which reduction of the NOx takes place is between 150° C. and 500° C. depending on the composition of the material.

EXAMPLE 4

An upper $ZnCuAl_2O_4$ spinel that also contains 8 wt. % $CeO_2$ is used as the spinel for the supporting material. To produce this spinel, the spinel was impregnated with 8 wt. % $CeO_2$, starting with a $ZnCuAl_2O_4$ spinel.

Measurement of the $ZnCuAl_2O_4$ spinel impregnated with 8 wt. % $CeO_2$ shows a clear decrease in NOx(NO) concentration with increasing temperature, which reaches a low point at abut 300° C. and then rises again.

The $ZnCuAl_2O_4$ spinel +8 wt. % $CeO_2$ shows a drastic decrease in NOx concentration starting at about 200° C., with the hydrocarbons being simultaneously converted to $CO_2$, as indicated by the increase in $CO_2$ concentration. The temperature window in which reduction of NOx takes place is between 200° C. and 500° C. depending on the composition of the material.

EXAMPLE 5

The above-mentioned $ZnCuAl_2O_4$ spinel mixed with the oxides of tungsten, vanadium, and titanium was used as the spinel for the supporting material. The mixture contains 50 wt. % of $ZnCuAl_2O_4$ spinel, with the remaining 50 wt. % of the mixture being made up of 5 wt. % $WO_3$, 3 wt. % $V_2O_5$, and 42 wt. % $TiO_3$.

Measurement of the spinel according to Example 5 shows a clear decrease in NOx(NO) concentration with increasing temperature, which reaches a low point at about 240° C. and then rises again.

The mixture showed a drastic decrease in NOx concentration starting at about 150° C., with the hydrocarbons being simultaneously decomposed to form $CO_2$, as indicated by the increase in $CO_2$ concentration. The temperature window in which reduction of the NOx takes place is between 150° C. and 500° C. depending on the composition of the material.

EXAMPLE 6

A $ZnCuAl_2O_4$ spinel of known composition impregnated with 0.1% vanadium was used as the spinel for the supporting material.

Measurement of the spinel according to Example 6 showed a sharp drop in NOx(NO) concentration with rising temperature which reaches a low point at about 300° C. and then rises again.

The $ZnCuAl_2O_4$ spinel +vanadium, starting at about 170° C., showed a drastic decrease in NOx concentration, with the hydrocarbons being simultaneously decomposed to form $CO_2$, as indicated by the increase in $CO_2$ concentration. The temperature window in which reduction of the NOx takes place is between 170° C. and 500° C. depending on the composition of the material.

EXAMPLE 7

The $ZnCuAl_2O_4$ spinel impregnated with 0.5% palladium was used once again as the spinel for the supporting material.

Measurement of the spinel according to Example 7 showed a sharp drop in NOx(NO) concentration with increasing temperature which reaches a low point at about 280° C. and then rises again.

Starting at about 180° C., the $ZnCuAl_2O_4$ spinel +0.5 wt. % palladium showed a drastic drop in NOx concentration, with the hydrocarbons being simultaneously decomposed to form $CO_2$, as indicated by the increase in $CO_2$ concentration. The temperature window in which reduction of the NOx takes place is between 180° C. and 500° C. depending on the composition of the material.

In all the examples, the temperature interval given favorably approximates the range that can occur in an exhaust line of an internal combustion engine. Therefore, the methods, devices, and compositions of the invention can all be incorporated into exhaust systems of any vehicle machine or article of manufacture comprising an internal combustion engine.

Since the spinels used for the supporting material exhibit a good response behavior even at relatively low temperatures and also show good storage behavior for hydrocarbons below these response temperatures, they are especially suitable for use as HC and/or CO and/or NOx exhaust catalysts in stoichiometrically operated internal combustion engines using so-called three-way catalysts.

The supporting materials discussed herein also display a high resistance to NOx, $H_2O$, $CO_2$, and $H_2O$.

We claim:

1. A method for removing one or more nitrogen oxides from the gas from an internal combustion engine, comprising:

contacting said gas in a temperature range from about 50 to about 300° C. with a gas scrubbing device comprising an intermediate storage medium, wherein the intermediate storage medium comprises:

a storage material comprising at least one or more metals, metal oxides or metal alloys of Group IB and Group VIII of the periodic chart; and a catalytic material having a general formula $A_aB_bO_4$, wherein A is at least one of Mg, Ca, Mn, Fe, Ni, Co, Cu, Zn, Sn and Ti; B is at least one of Al, Ga, In, Co, Fe, Cr, Mn, Cu, Zn, Sn, Ti and Ni; $a+b \leq 3$ and a and b are greater than 0;

storing one or more nitrogen oxides in said storage material;

releasing a portion of said stored nitrogen oxides when said storage medium is at a temperature above about 100° C.; and reducing said released nitrogen oxides in the presence of said catalytic material.

2. The method according to claim 1, wherein said gas is in the temperature range from about 50 to about 150° C.

3. The method according to claim 1, wherein said releasing of said stored nitrogen oxides is at a temperature above 150° C.

4. The method according to claim 1, wherein the nitrogen oxides comprise NO and $NO_2$.

5. The method according to claim 1, wherein said gas contains at least one of water and steam.

6. The method according to claim 1, wherein said releasing of said stored nitrogen oxides is at a temperature of above 200° C.

7. The method according to claim 1, wherein said storage material comprises one or more of metals, oxides and alloys comprising elements Cu, Ag, Au, Fe, Co, Ni, Ru, Rh, Pd, Re, Os, Ir, Pt.

8. The method according to claim 1, wherein said contacting is immediately after starting an internal combustion engine.

9. The method according to claim 1, wherein said intermediate storage medium is porous.

10. The method according to claim 1, wherein the storage material is mixed with the catalytic material.

11. A method for removing one or more nitrogen oxides from the gas from an internal combustion engine, comprising:

contacting said gas in a temperature range from about 50 to about 300° C. with a gas scrubbing device comprising an intermediate storage medium, wherein the intermediate storage medium comprises:

a porous storage material comprising at least one or more metals, metal oxides or metal alloys of Group IB and Group VIII of the periodic chart; and a catalytic material having a general formula $A_{a(1-x)}B_bO_4$, wherein A is at least one of Mg, Ca, Mn, Fe, Ni, Co, Cu, Zn, Sn and Ti; B is at least one of Al, Ga, In, Co, Fe, Cr, Mn, Cu, Zn, Sn, Ti and Ni; a+b<3, with a, b>0, and $0 \leq x \leq 1$;

storing one or more nitrogen oxides in said porous storage material;

releasing a portion of said stored nitrogen oxides when said storage medium is at a temperature above about 100° C.; and reducing said released nitrogen oxides in the presence of said catalytic material.

12. A method for removing one or more nitrogen oxides from the gas from an internal combustion engine, comprising:

contacting said gas in a temperature range from about 50 to about 300° C. with a gas scrubbing device comprising an intermediate storage medium, wherein the intermediate storage medium comprises:

a porous storage material comprising at least one or more metals, metal oxides or metal alloys of Group IB and Group VIII of the periodic chart; and a catalytic material having a general formula $Al_{a1(1-x)}A2_{a2(1-x)}B_bO_4$, wherein A1 and A2 are independently at least one of Mg, Ca, Mn, Fe, Ni, Co, Cu, Zn, Sn and Ti; B is at least one of Al, Ga, In, Co, Fe, Cr, Mn, Cu, Zn, Sn, Ti and Ni; a1+a2+b$\leq$3 with a1, a2, b>0 and $0 \leq x < 1$;

storing one or more nitrogen oxides in said porous storage material;

releasing a portion of said stored nitrogen oxides when said storage medium is at a temperature above about 100° C.; and reducing said released nitrogen oxides in the presence of said catalytic material.

\* \* \* \* \*